No. 12,639. REISSUED APR. 23, 1907.

G. GEORGENSON & J. E. HENNEN.

CONTRACTIBLE MOLD.

APPLICATION FILED MAR. 21, 1907.

WITNESSES

F. C. Barry

Chas. W. Hart

INVENTORS

GEORGE GEORGENSON

JOSEPH E. HENNEN

BY Munn & Co.

ATTORNEYS

UNITED STATES PATENT OFFICE.

GEORGE GEORGENSON AND JOSEPH E. HENNEN, OF FOND DU LAC, WISCONSIN.

CONTRACTIBLE MOLD.

No. 12,639 Specification of Reissued Letters Patent. Reissued April 23, 1907.

Original No. 841,504, dated January 15, 1907. Application for reissue filed March 21, 1907. Serial No. 363,783.

*To all whom it may concern:*

Be it known that we, GEORGE GEORGENSON and JOSEPH E. HENNEN, citizens of the United States, and residents of Fond du Lac, in the county of Fond du Lac and State of Wisconsin, have invented an Improved Contractible Mold, of which the following is a description.

Our invention is an improved flexible mold for use in the construction of arches, culverts, sewers, or the like in which a temporary support is required for the cement, brick, or stone employed in the construction.

In carrying out our invention we employ what may be termed a "cylinder," the same being formed of sheet metal and provided interiorly with means for expanding and contracting it.

The details of construction, arrangement, and combination of parts embodying our invention are as hereinafter described, and illustrated in the accompanying drawings, in which—

Figure 1:
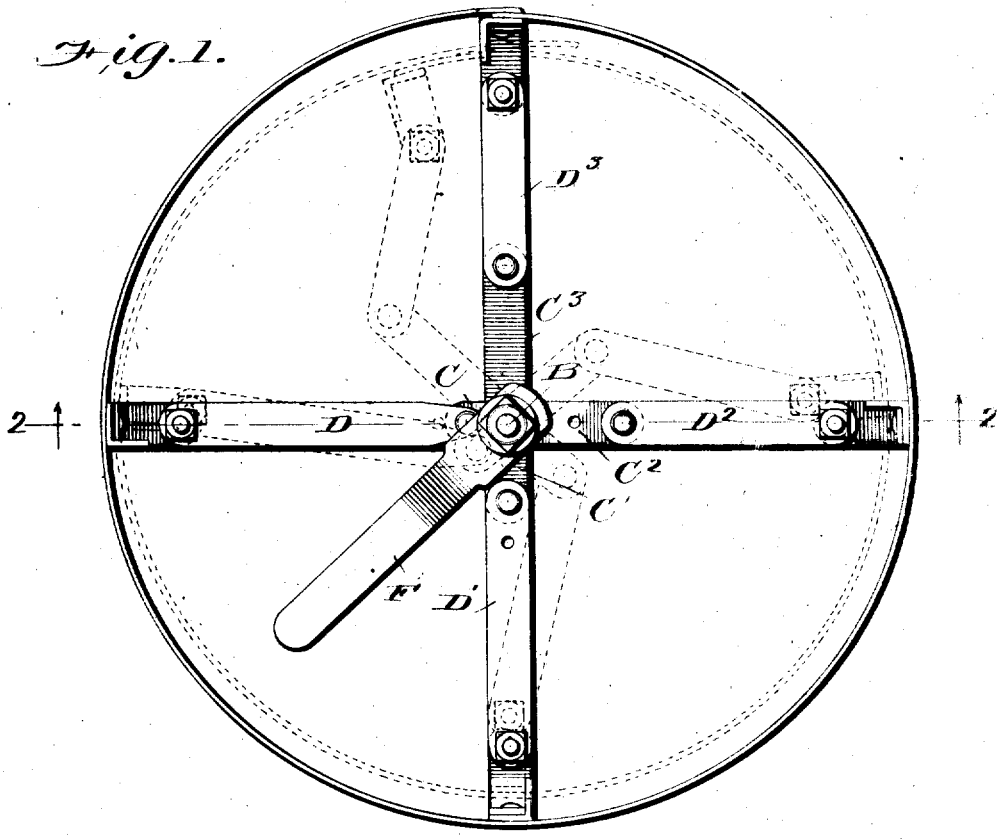
Figure 2:
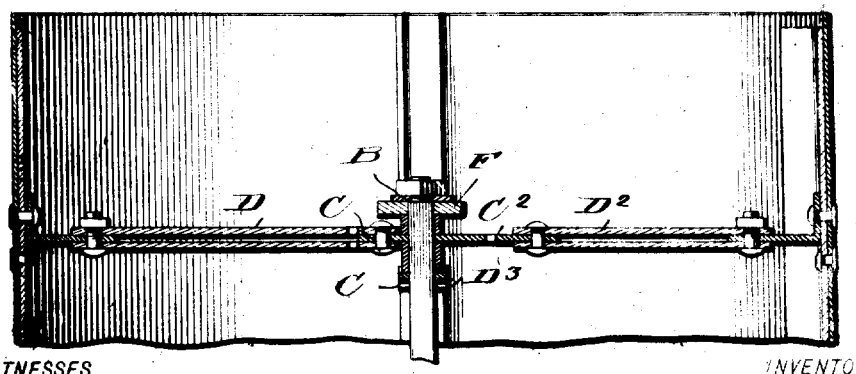

Figure 1 is an end elevation of the mold. Fig. 2 is a transverse section of the same.

A indicates the shell of the mold, the same being formed of sheet metal combining a due degree of elasticity and rigidity whereby it is adapted for supporting an arch for the concrete or other material and to be contracted for reducing its diameter as required to enable it to be withdrawn when the arch has been completed. The shell is preferably constructed in one piece for the sake of economy and uniform elasticity, although it is obvious it may be constructed in pieces or sections whose edges must be firmly united. It is made of any desired or practicable length and is adjusted from time to time lengthwise according to the length of the arch or other work being done. In this instance the ends or edges of the sheet metal overlap; but they might be separated by a narrow space. The size or diameter of the mold will of course be varied according to different kinds of work. The contracting and expanding mechanism arranged within the shell A is composed of the following parts: A polygonal shaft B is arranged centrally or coincidently with the axis of the shell A, and it is provided with a series of rigid radial arms C C′ $C^2$ $C^3$, which are in turn connected with the shell respectively by links or connecting-bars D, D′, $D^2$, and $D^3$. The outer ends of these links or bars are not attached directly to the shell, but to a series of lugs E, the same being constructed in such manner that they may be riveted to the shell and allow due movement of the several links or connecting-bars. A handle F is mounted on the protruding end of the shaft B for use in rotating the latter. It will be seen that the several arms C, C′, &c., differ in length, the arms C being the shortest, the arms C′ the next shortest, and the others increasing in length progressively. The links or connecting-bars D, D′, &c., vary inversely in length, the bar D being the longest and the others being made progressively shorter, corresponding to the increasing length of the arms C, C′, $C^2$. The object of this construction is as follows. When the parts are in the normal position, (shown by full lines,) the shell A closely approximates a true circle. It is absolutely necessary, however, that in contracting the shell it should not be thrown into elliptical form in cross-section, since it might in such case still be, or remain, in contact with the work at two points in its circumference. By making the arms C, C′ and bars D, D′ &c. so that they vary progressively in length, as illustrated in the drawings, this result is avoided, the form of the shell when contracted being substantially as indicated by dotted lines Fig. 1. In practice the arms $C^2$ and $C^3$ are approximately double the length of the respectively opposite ones C and C′; it will also be noted that the longest arms $C^3$ and shortest bars $D^3$ connect the shaft B with the inner edge of the shell, and that the next longest arms $C^2$ and next shortest bars $D^2$ are on the right of the shaft B, and the shortest arms C and longest bars D are directly opposite the arms $C^2$ and bars $D^2$. This arrangement enables the shell to be contracted in desired manner.

It is obvious that by adjusting the hand-lever F in the direction of the arrow, Fig. 1, the mechanism connected therewith will be thrown into the positions indicated by dotted lines, and the shell will also assume the contracted form represented by dotted lines, the overlapping portion or edge being in such case projected a considerable distance over the opposite edge.

By providing either the arms C, C′ &c., or the bars D, D′, &c., with holes, as indicated in Fig. 1, the pivots that connect the arms and bars may be shifted, and thus the shell may, if required, be contracted in one diameter more than in another which form may be requisite or desired in some kinds of work. It will be seen that in any case, or whatever be the form of shell, it is supported or braced interiorly whenever the radial arms of the shaft and the connecting links or bars are in alinement, as shown by full lines in Fig. 1.

What we claim is:

1. A contractible mold comprising a shell formed of sheet metal, a central shaft having a series of radial arms differing progressively in length, and a like series of links or bars connecting said arms with the shell and varying in length inversely as to the arms, substantially as described.

2. The improved contractible mold comprising a flexible shell, a central shaft having a lever adapted for rotating it, and a series of rigid arms which are fast on said shaft and differ progressively in length, a series of links or bars pivoted to the arms and at their outer ends to the shell and varying progressively in length but inversely as to the said arms, substantially as described.

GEORGE GEORGENSON.
JOSEPH E. HENNEN.

Witnesses to the signature of Georgenson—
THOS. H. WRIGHT,
D. A. MARINE.

Witnesses to the signature of Hennen—
E. C. KRAEMER,
E. A. SEELEY.